United States Patent
Sugiura et al.

(10) Patent No.: US 12,044,594 B2
(45) Date of Patent: Jul. 23, 2024

(54) ABNORMALITY DIAGNOSTIC METHOD AND ABNORMALITY DIAGNOSTIC DEVICE FOR ROLLING BEARING

(71) Applicant: OKUMA CORPORATION, Niwa-Gun (JP)

(72) Inventors: Hiraku Sugiura, Niwa-Gun (JP); Issei Koike, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 1272 days.

(21) Appl. No.: 16/363,172

(22) Filed: Mar. 25, 2019

(65) Prior Publication Data

US 2019/0301975 A1  Oct. 3, 2019

(30) Foreign Application Priority Data

Mar. 30, 2018 (JP) .................................. 2018-068814

(51) Int. Cl.
  *G01M 13/045* (2019.01)
  *F16C 35/12* (2006.01)
  *F16C 19/52* (2006.01)

(52) U.S. Cl.
  CPC ........... *G01M 13/045* (2013.01); *F16C 35/12* (2013.01); *F16C 19/52* (2013.01); *F16C 2233/00* (2013.01)

(58) Field of Classification Search
  CPC .... G01M 13/045; F16C 35/12; F16C 2233/00
  (Continued)

(56) References Cited

U.S. PATENT DOCUMENTS 8,146,433 B2    4/2012 Kishino et al.
2008/0033695 A1*  2/2008 Sahara .................... G01H 1/003
                                                        702/185
(Continued)

FOREIGN PATENT DOCUMENTS

JP    H07324974 A  *  6/1994
JP    4120099 B2    7/2008
(Continued)

OTHER PUBLICATIONS

Chinese Office Action (with English translation), Chinese Application No. 201910249141.x, dated Feb. 28, 2022 (10 pages).

*Primary Examiner* — Paul D Lee
(74) *Attorney, Agent, or Firm* — BURR PATENT LAW, PLLC (57) ABSTRACT

A method for diagnosing an abnormality of rolling bearing includes: measuring a vibration of a rotator; performing a frequency analysis on the vibration to calculate a magnitude of a vibration at each frequency; calculating a characteristic frequency as a frequency of a vibration from a specification of the rolling bearing and a rotation speed of the rotator at a vibration measurement in the measuring; calculating a vibration value from which an effect of the rotation speed is removed by dividing a magnitude of a vibration at the characteristic frequency by a value including a base and an exponent, the base being a predetermined physical quantity in a proportional relation with an angular velocity of the rotator at the vibration measurement in the measuring, the exponent being a positive number; calculating an evaluation index based on the vibration value; and determining an existence of an abnormality based on the evaluation index.

8 Claims, 6 Drawing Sheets

(58) Field of Classification Search
USPC ............................................................ 702/56
See application file for complete search history.

(56) References Cited

U.S. PATENT DOCUMENTS

| | | | |
|---|---|---|---|
| 2013/0006540 A1* | 1/2013 | Sakaguchi | F03D 17/00 |
| | | | 702/34 |
| 2013/0173026 A1* | 7/2013 | Kawana | G05B 5/01 |
| | | | 700/30 |
| 2016/0187226 A1* | 6/2016 | Tsutsui | G01M 13/045 |
| | | | 73/593 |
| 2017/0131704 A1* | 5/2017 | Nishimura | G05B 19/186 |
| 2017/0260968 A1* | 9/2017 | Tsutsui | F03D 1/0675 |
| 2018/0043492 A1* | 2/2018 | Ando | B23Q 1/70 |
| 2018/0224324 A1* | 8/2018 | Ikeda | G01M 99/00 |

FOREIGN PATENT DOCUMENTS

| | | |
|---|---|---|
| JP | 2010-071738 A | 4/2010 |
| JP | 5146008 B2 | 2/2013 |
| JP | 2017-037052 A1 | 2/2017 |

* cited by examiner

ABNORMALITY DIAGNOSTIC METHOD AND ABNORMALITY DIAGNOSTIC DEVICE FOR ROLLING BEARING

CROSS REFERENCE TO RELATED APPLICATION

This application claims the benefit of Japanese Patent Application Number 2018-068814 filed on Mar. 30, 2018, the entirety of which is incorporated by reference.

FIELD OF THE INVENTION

The disclosure relates to a method and a device that diagnose an abnormality of a rolling bearing that is used in, for example, a machine tool to support a rotator of, for example, a spindle.

BACKGROUND OF THE INVENTION

When an abnormality, such as a damage in an inner race, occurs in a rolling bearing that supports a rotator, a vibration is caused. Since a force caused by the abnormality of the bearing is not in a simple sinusoidal wave shape, a vibration of a harmonic frequency component is simultaneously observed. The frequency (characteristic frequency) of the vibration generated at this time is proportional to a rotation speed, and can be calculated from the rotation speed of the rotator and bearing specifications.

When magnitudes of vibrations of two characteristic frequencies differ by a fundamental frequency are both large, it is also possible to interpret that amplitudes fluctuate at the fundamental frequency when a waveform of the measured vibration is viewed. Accordingly, there is known a diagnostic method that quantifies a degree of the amplitude fluctuation by performing a frequency analysis after performing envelope processing on the waveform of the measured vibration.

For example, Japanese Patent No. 4120099 discloses a method that measures a vibration or a sound to perform the envelope processing and the frequency analysis, and determines an existence of an abnormality. The existence of the abnormality is determined from a magnitude of a calculation value obtained by dividing a magnitude of the vibration of a fundamental frequency component by an overall value as an integral value of all spectrum components.

Japanese Patent No. 5146008 discloses a diagnostic method that measures a vibration to perform the envelope processing and the frequency analysis, and compares a value of a characteristic frequency component with a threshold. The threshold is individually configured per characteristic frequency in consideration of a level difference of a vibration response measured in advance by a hammering test and a rotation speed.

JP-A-2017-37052 discloses a method that takes a measurement in a resonant frequency band where a vibration is measured large for the purpose of improving vibration measurement accuracy, and multiplies an inverse function of a transfer function in order to reduce amplified signal strength.

A magnitude of a vibration cannot be identically measured even when an excitation force with an identical magnitude caused by an identical abnormality occurs, because a mode of vibration (transfer function) of a machine has an effect. The envelope processing is to collectively captures vibrations of a plurality of frequencies without considering that magnitudes of the transfer functions differ at the respective frequencies. The envelope processing has a processing method in which information on the plurality of frequencies is irreversibly mixed.

When a diagnosis is performed on a rotator having a complicated mode of vibration, such as a spindle of a machine tool, a magnitude of a vibration of a characteristic frequency after the envelope processing possibly changes by several times even though a rotation speed of the rotator is changed by 10 percent to change the characteristic frequency only by 10 percent. Its increase and decrease with respect to the change of the rotation speed is irregular, and there also exists a rotation speed that is not distinguished from a normal occasion to an abnormal occasion when a measurement variation is considered.

The processing where the magnitude of the vibration of the characteristic frequency after the envelope processing is divided by an overall is not a method to remove an effect of the transfer function and the rotation speed. Therefore, the calculated value calculated in the method in Japanese Patent No. 4120099 has a problem that a quantitative comparison cannot be performed even though it may be used to the extent of determining an existence of a scratch.

Performing the envelope processing irreversibly mixes the information on the plurality of frequencies to make a vibration of another frequency different from the frequency of the original vibration. Therefore, when a threshold is determined by the effect of the transfer function and the rotation speed with respect to the magnitude of the vibration of characteristic frequency after the envelope processing, as proposed in Japanese Patent No. 5146008, the threshold cannot be rationally determined from the transfer function and the rotation speed. In view of this, generally in a commercially available bearing diagnostic device, a setting of the threshold to determine the abnormality is made by a user, set in advance. However, as the determination result is changed depending on the rotation speed at which the measurement is taken, the determination cannot be made when an actual abnormality exists.

Furthermore, in the method in JP-A-2017-37052, the magnitude of the original vibration cannot be calculated when the measurement of the transfer function is difficult. On the other hand, in order to identify the transfer function in an experiment, both input and output signals are necessary. In order to identify the transfer function from an excitation force caused by an abnormality of a bearing to a vibration value at a sensor position, it is necessary to input a known excitation force at a bearing position of a machine after assembly. However, there is a problem that it is difficult to excite the bearing position of the machine after assembly. When a transfer function in which an excitable adjacent area of the bearing is excited is used instead, which the substitute transfer function value cannot deal with a vibration of a frequency when it is significantly different from the transfer function from the excitation force caused by the abnormality of the bearing to the vibration value at the sensor position.

Under the above mentioned situation, there is also known a method that calculates the transfer function by analyzing a three-dimensional CAD model of the machine by a finite element method. However, it is difficult to appropriately set a magnitude of attenuation, and an absolute magnitude of the transfer function cannot be accurately calculated.

Meanwhile, not only the magnitude of the vibration caused with respect to the identical force differs depending on the transfer function, but a magnitude of a force caused by a bearing failure changes depending on the rotation speed. In order to calculate an absolute evaluation index from the magnitude of the measured vibration. It is necessary that both a relationship between the magnitude of the force caused by the bearing failure and the rotation speed, and the transfer function are considered.

Therefore, the disclosure has been made in consideration of the above-described problems and it is an object to provide an abnormality diagnostic method and an abnormality diagnostic device for rolling bearing that can determine an existence of an abnormality with high accuracy by calculating an absolute evaluation index that can be compared with another machine without getting effects of a rotation speed and a transfer function.

SUMMARY OF THE INVENTION

In order to achieve the above-described object, there is provided a method for diagnosing an abnormality of rolling bearing that supports a rotator according to a first aspect of the disclosure. The method includes measuring a vibration of the rotator, performing a frequency analysis on the vibration to calculate a magnitude of a vibration at each frequency; calculating a characteristic frequency as a frequency of a vibration from a specification of the rolling bearing and a rotation speed of the rotator at a vibration measurement in the measuring. The method also includes calculating a vibration value from which an effect of the rotation speed is removed by dividing a magnitude of a vibration at the characteristic frequency by a value including a base and an exponent, the base being a predetermined physical quantity in a proportional relation with an angular velocity of the rotator at the vibration measurement in the measuring, the exponent being a positive number, and then, calculating an evaluation index based on the vibration value. Furthermore, the method includes determining an existence of an abnormality based on the evaluation index.

In a method for diagnosing an abnormality of rolling bearing according to a second aspect of the disclosure, which is in the first aspect of the disclosure, the exponent is 2.

In a method for diagnosing an abnormality of rolling bearing according to a third aspect of the disclosure, which is in the first aspect of the disclosure, the vibration of the rotator is measured using a vibration sensor in the vibration measurement step, the evaluation index is calculated using the vibration value and a transfer function from an excitation force caused by a bearing failure to a vibration at a position of the vibration sensor at the characteristic frequency in the evaluation index calculation step, and the existence of the abnormality is determined by comparing the evaluation index with a threshold set in advance in the determination step.

In a method for diagnosing an abnormality of rolling bearing according to a fourth aspect of the disclosure, which is in the third aspect of the disclosure, a vibration measurement is taken at a plurality of the rotation speeds in the vibration measurement step, and a weighted average evaluation index is calculated as the evaluation index in the evaluation index calculation step. The weighted average evaluation index is weighted by a magnitude of the transfer function.

In a method for diagnosing an abnormality of rolling bearing according to a fifth aspect of the disclosure, which is in the fourth aspect of the disclosure, the vibration value and the transfer function for calculating the weighted average evaluation index are used only when the characteristic frequency is included in a range specified in advance.

In a method for diagnosing an abnormality of rolling bearing according to a sixth aspect of the disclosure, which is in the fourth aspect of the disclosure, the method further executes a recommended highest rotation speed calculation step when the abnormality is determined in the determination step. The recommended highest rotation speed calculation step calculates a recommended highest rotation speed using any one of the evaluation index or the weighted average evaluation index, a mass of the rotator, and an upper-limit value of a balance quality of a rigid rotor of the rotator.

In a method for diagnosing an abnormality of rolling bearing according to a seventh aspect of the disclosure, which is in the sixth aspect of the disclosure, the method further executes a display step of displaying the recommended highest rotation speed on a display unit.

In a method for diagnosing an abnormality of rolling bearing according to an eighth aspect of the disclosure, which is in any one of the third to the seventh aspects of the disclosure, the rotator is a spindle of a machine tool, and a tool or a jig mounted on the spindle is determined and the transfer function is selected corresponding to the determined tool or jig in the vibration value calculation step. The transfer function is used for calculating the evaluation index or the weighted average evaluation index.

In order to achieve the above-described object, there is provided a device for diagnosing an abnormality of rolling bearing that supports a rotator according to a ninth aspect of the disclosure. The device includes vibration measurement means that measures a vibration of the rotator, and frequency analysis means that performs a frequency analysis on the vibration to calculate a magnitude of a vibration at each frequency. Further, the device includes characteristic frequency calculation means that calculates a characteristic frequency as a frequency of a vibration from a specification of the rolling bearing and a rotation speed of the rotator at a vibration measurement by the vibration measurement means. Furthermore, the device includes vibration value calculation means that calculates a vibration value from which an effect of the rotation speed is removed by dividing a magnitude of a vibration at the characteristic frequency by a value including a base that is a predetermined physical quantity in a proportional relation with an angular velocity of the rotator at the vibration measurement by the vibration measurement means, and an exponent that is a positive number. Additionally, the device includes evaluation index calculation means that calculates an evaluation index based on the vibration value, and determination means that determines an existence of an abnormality based on the evaluation index.

With the disclosure, the vibration value, from which the effect of the rotation speed is removed, is calculated and the evaluation index for determining the existence of the abnormality is calculated based on the vibration value. The effect of the rotation speed is removed by dividing the magnitude of the vibration at the characteristic frequency by the value including the base, which is the predetermined physical quantity in the proportional relation with the angular velocity of the rotator at the vibration measurement, and the exponent, which is the positive number. Accordingly, appropriately selecting the rotation speed with respect to the characteristic frequency whose value (characteristic frequency ratio) obtained by dividing the characteristic frequency by the rotational frequency is different ensures measuring and comparing as the vibration of any frequency. Thus, it is possible to measure the vibrations of all the characteristic frequency ratios at an identical frequency at which the transfer function is identical. Therefore, for example, a value obtained by dividing the vibration value from which the effect of the rotation speed of a certain characteristic frequency ratio is removed by an average value (overall value) of the vibration value from which the effect of the rotation speed is removed can be calculated. The value does not get the effect of the transfer function, thereby ensuring evaluation without getting the effect of the measuring position and the mode of vibration. Accordingly, the absolute evaluation index that can be compared with that of another machine can be calculated without getting the effect of the rotation speed and the transfer function, thus ensuring a determination of the existence of the abnormality with high accuracy.

DETAILED DESCRIPTION OF THE INVENTION

The following describes an embodiment of the disclosure based on the drawings.

Figure 1:
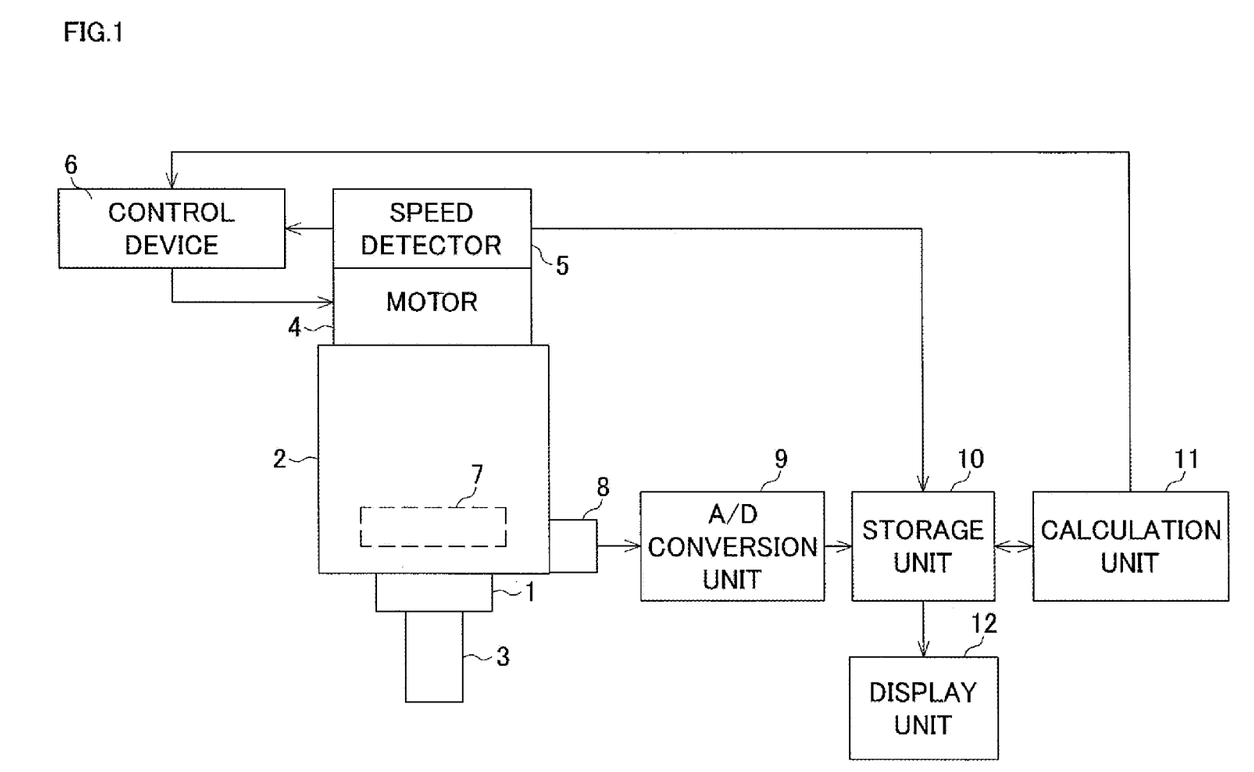
FIG. 1 is a function block diagram of an abnormality diagnostic device for rolling bearing.

FIG. 1 is a function block diagram illustrating a configuration when an abnormality diagnostic device for rolling bearing is applied to a spindle of a machine tool. A description will be specifically given based on the drawing.

A spindle 1 is rotatably mounted on a main spindle housing 2 via a bearing 7 as a rolling bearing. A tool 3 for machining is secured to the spindle 1. A motor 4 drives the spindle 1. A speed detector 5 is disposed on the motor 4, and a measured rotation speed of the motor 4 is input to a control device 6. The control device 6 controls a current supplied to the motor 4 so as to keep the rotation speed of the motor 4 measured with the speed detector 5 at a command rotation speed when machining is performed.

On the main spindle housing 2, a vibration sensor 8 as vibration measuring means is mounted. A vibration acceleration measured with the vibration sensor 8 is converted into a digital value in an A/D conversion unit 9, and stored in a storage unit 10 together with a rotation speed at the measurement of the vibration. The storage unit 10 also stores a transfer function from an excitation force caused by a bearing failure to a vibration at a position of the vibration sensor 8 while the tool 3 is mounted, a mass of the spindle 1 as a rotator, and a specified highest rotation speed of the spindle 1. A calculation unit 11 calculates a characteristic frequency of the bearing failure from the rotation speed at the vibration measurement stored in the storage unit 10 and bearing specifications. The calculation unit 11 then calculates an amplitude of the vibration acceleration at the characteristic frequency by performing Fourier transformation on the vibration acceleration stored in the storage unit 10. Next, the calculation unit 11 determines whether it is normal or not by calculating an abnormality degree as an evaluation index and a recommended highest rotation speed from the rotation speed at the measurement, the transfer function, the mass of the spindle 1, and the specified highest rotation speed of the spindle 1. In short, the calculation unit 11 functions as frequency analysis means, characteristic frequency calculation means, vibration value calculation means, evaluation index calculation means, and determination means. The diagnostic result by the calculation unit 11 is displayed on a display unit 12.

In case the bearing 7 locally has an inner race scratch, the inner race scratch rotates with a rotation of the spindle 1 which changes a direction of a vibration caused when a rolling element passes a position of the scratch. Therefore, vibrations of a frequency decreased by a rotational frequency $f_{ROT}$ and a frequency increased by the rotational frequency $f_{ROT}$ are observed with respect to the frequency at which the rolling element passes the inner race scratch. A calculation of the characteristic frequency can be performed as the following Math. 1 and Math. 2. Here, $f_{I,N-}$ is a characteristic frequency on a low side of Nth of an inner race scratch, $f_{I,N+}$ is a characteristic frequency on a high side of Nth of the inner race scratch, Z is a count of the rolling element of the bearing 7, D is a pitch circle diameter of the bearing 7, d is a diameter of the rolling element of the bearing 7, and α is a contact angle of the bearing 7.

$$f_{I,N-}(f_{ROT}) = f_{ROT}\left[\frac{NZ}{2}\left(1 + \frac{d}{D}\cos\alpha\right) - 1\right] \quad \text{[Math. 1]}$$

$$f_{I,N+}(f_{ROT}) = f_{ROT}\left[\frac{NZ}{2}\left(1 + \frac{d}{D}\cos\alpha\right) + 1\right] \quad \text{[Math. 2]}$$

Figure 2A:
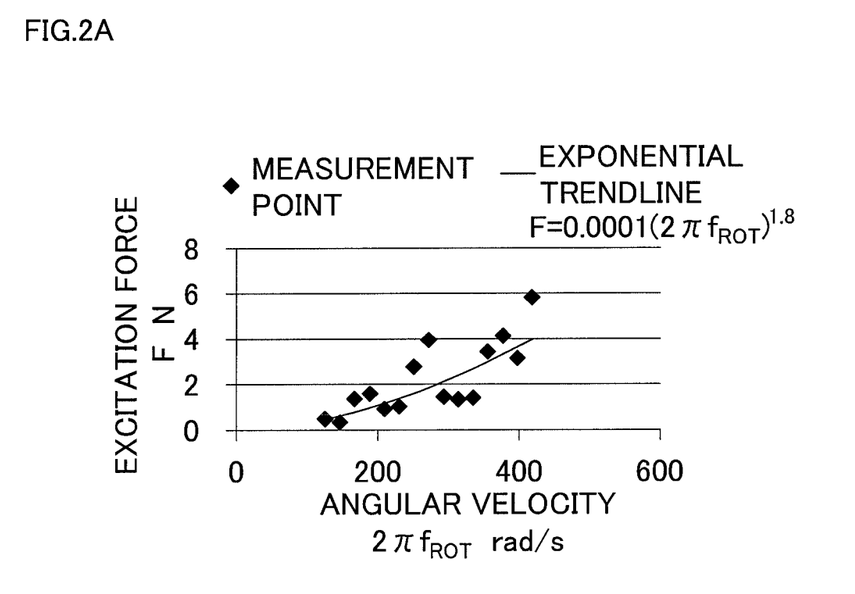
FIGS. 2A and 2B are graphs illustrating relationships between an excitation force and an angular velocity caused by a bearing failure.
Figure 2B:
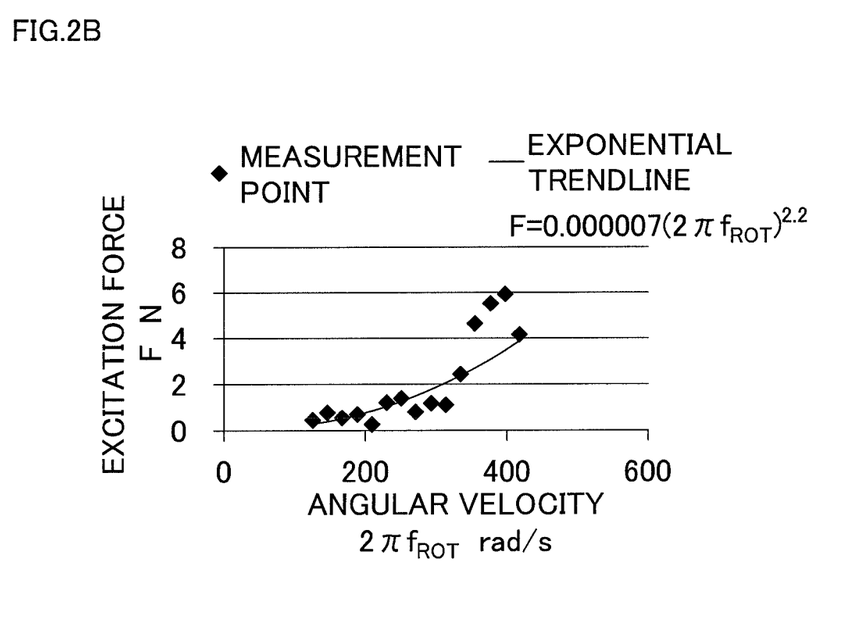

FIGS. 2A and 2B show excitation forces F caused by the bearing failure on a vertical axis and an angular velocity on a horizontal axis. The excitation force F is calculated as follows. First, vibration accelerations, at a plurality of rotation speeds for the spindle 1 supported by the bearing 7 with the inner race scratch, is measured to calculate vibration amplitudes at the characteristic frequency ratios. Next, the vibration amplitudes at the characteristic frequency ratios is divided by transfer function from the excitation forces caused by the bearing failure to the vibration at the position of the vibration sensor 8 corresponding to the respective characteristic frequency ratios.

However, the transfer function used here is not the transfer function from the excitation force caused by the bearing failure to the vibration at the position of the vibration sensor 8. Instead, the transfer function obtained by measuring a vibration at the position of the vibration sensor 8 when an adjacent area of the bearing is excited is used. Here, the adjacent area of the bearing indicates a position where a generation position of the excitation force caused by the bearing failure and a direction and a magnitude of the vibration can be regarded as identical at least in a certain frequency range when the position of the vibration sensor 8 obtained by, for example, the finite element analysis is excited. According to the reciprocal theorem that an identical result is obtained even when input and output of a transfer function are interchanged, it is possible to use the transfer function obtained by exciting the adjacent area of the bearing in a certain frequency range as a substitute of the transfer function from the excitation force caused by the bearing failure to the vibration at the position of the vibration sensor 8.

It can be seen that the excitation force caused by the bearing failure tends to increase with respect to an increase of the angular velocity from FIGS. 2A and 2B. The excitation force caused by the bearing failure is roughly proportional to approximately a square of the angular velocity. It is conceivable that, in case there is the inner race scratch, the spindle 1 is displaced and deformed in a direction of the scratch when the rolling element passes. However, when a trajectory (displacement) on which a center of gravity of the spindle 1 passes can be regarded as constant irrespective of the rotation speed, a force that is generated as a counteraction to displace the center of gravity of the spindle 1 is proportional to a second derivative of the displacement of the center of gravity. The frequency of the vibration displacement of the center of gravity is the rotational frequency and the characteristic frequency proportional to the angular velocity. Therefore, the force is proportional to the square of the angular velocity at the vibration measurement. The experimental result and hypothesis estimate that the excitation force caused by the bearing failure is proportional to the square of the angular velocity.

Thus, when the relationship between the excitation force caused by the bearing failure and the rotation speed is apparent, it is possible to calculate a value (vibration value in consideration of rotation speed) obtained by removing an effect of the rotation speed from the measured vibration value. Therefore, the vibration measurement can be performed by selecting the rotation speed at which a transfer function of a focused characteristic frequency is large (highly sensitive).

Another abnormality of the spindle 1 that also has a property of being proportional to the square of the rotation speed is an unbalance. The excitation force caused by the unbalance has a magnitude obtained by multiplying an unbalance amount having a dimension of a product of mass and length by the square of the angular velocity. Dividing a vibration value caused by the bearing damage by the transfer function and the square of the angular velocity ensures calculating an evaluation index that can be compared with the unbalance amount.

When a plurality of rotation speeds is measured, it is difficult to discuss with the characteristic frequency that changes by the rotation speed. Therefore, it is discussed with a value (characteristic frequency ratio) of the characteristic frequency divided by the rotational frequency. Characteristic frequency ratio $k_{I,N-}$ on the low side of Nth of the inner race scratch, and characteristic frequency ratio $k_{I,N+}$ on the high side of Nth of the inner race scratch, can be obtained as the following Math. 3 and Math. 4, respectively.

$$k_{I,N-} = \frac{NZ}{2}\left(1 + \frac{d}{D}\cos\alpha\right) - 1 \quad \text{[Math. 3]}$$

$$k_{I,N+} = \frac{NZ}{2}\left(1 + \frac{d}{D}\cos\alpha\right) + 1 \quad \text{[Math. 4]}$$

Meanwhile, the rotational frequency $f_{ROT}$ ($f_0$, m) with which the vibration frequency of frequency ratio m becomes $f_0$ can be obtained as the following Math. 5.

$$f_{ROT}(f_0, m) = \frac{f_0}{m} \quad \text{[Math. 5]}$$

When a magnitude of a vibration component at the frequency $f_0$ and the frequency ratio m of the vibration acceleration measured in the obtained rotational frequency $f_{ROT}(f_0, m)$ is represented as $A(m, f_{ROT}(f_0, m))$, a vibration value $A^*(m, f_{ROT}(f_0, m))$ in consideration of the rotation speed can be obtained as the following Math. 6.

$$A^*(m, f_{ROT}(f_0, m)) = \frac{A(m, f_{ROT}(f_0, m))}{(2\pi f_{ROT}(f_0, m))^2} \quad \text{[Math. 6]}$$

When the magnitude of the transfer function from the excitation force caused by the bearing failure at the frequency $f_0$ to the vibration at the position of the vibration sensor 8 is $G(f_0)$, an abnormality degree $U^*(m, f_{ROT}(f_0, m))$ that can be compared with the unbalance amount can be obtained as the following Math. 7. Although it is described later, $G(f_0)$ here is allowed to be unknown.

$$U^*(m, f_{ROT}(f_0, m)) = \frac{A^*(m, f_{ROT}(f_0, m))}{G(f_0)} \quad \text{[Math. 7]}$$
$$= \frac{A(m, f_{ROT}(f_0, m))}{(2\pi f_{ROT}(f_0, m))^2 G(f_0)}$$

When the vibration acceleration is measured at the rotational frequency $f_{ROT}(f_0, m)$ under n conditions where the frequency ratio m is from $m_{MIN}$ to $m_{MAX}$, an average $U_{ave}^*$ of the abnormality degree $U^*(m, f_{ROT}(f_0, m))$ can be obtained as the following Math. 8.

$$U_{ave}^* = \frac{\sum_{m=m_{MIN}}^{m_{MAX}} U^*(m, f_{ROT}(f_0, m))}{n} \quad \text{[Math. 8]}$$
$$= \frac{\sum_{m=m_{MIN}}^{m_{MAX}} \frac{A(m, f_{ROT}(f_0, m))}{(2\pi f_{ROT}(f_0, m))^2 G(f_0)}}{n}$$
$$= \frac{\sum_{m=m_{MIN}}^{m_{MAX}} \frac{A(m, f_{ROT}(f_0, m))}{(2\pi f_{ROT}(f_0, m))^2}}{n} \times \frac{1}{G(f_0)}$$

A ratio R(k) with respect to average $U_{ave}^*$ of the abnormality degree $U^*(k, f_{ROT}(f_0, k))$ in the characteristic frequency ratio k can be obtained as the following Math. 9.

$$R(k) = \frac{U^*(k, f_{ROT}(f_0, k))}{U_{ave}^*} \quad \text{[Math. 9]}$$
$$= \frac{\frac{A(k, f_{ROT}(f_0, k))}{(2\pi f_{ROT}(f_0, k))^2} \times \frac{1}{G(f_0)}}{\frac{\sum_{m=m_{MIN}}^{m_{MAX}} \frac{A(m, f_{ROT}(f_0, m))}{(2\pi f_{ROT}(f_0, m))^2}}{n} \times \frac{1}{G(f_0)}}$$
$$= \frac{\frac{A(k, f_{ROT}(f_0, k))}{(2\pi f_{ROT}(f_0, k))^2}}{\frac{\sum_{m=m_{MIN}}^{m_{MAX}} \frac{A(m, f_{ROT}(f_0, m))}{(2\pi f_{ROT}(f_0, m))^2}}{n}}$$

When it is a vibration acceleration measured in a single rotation speed, the vibration amplitude of the characteristic frequency ratio k and the vibration amplitude of a general frequency ratio m cannot be simply compared because of different frequencies causing different magnitudes in transfer functions. However, as is clear from Math. 9, it is possible to calculate the ratio R(k) with respect to the average $U_{ave}^*$ of the abnormality degree $U^*(k, f_{ROT}(f_0, k))$ at the characteristic frequency ratio k. The calculation of the ratio R(k) with respect to the average $U_{ave}^*$ is possible as long as the vibration acceleration of an identical frequency $f_0$ at the plurality of rotation speeds is always focused on. The calculation of the ratio R(k) with respect to the average $U_{ave}^*$ is possible even though the magnitude $G(f_0)$ of the transfer function from the excitation force caused by the bearing failure at the frequency $f_0$ to the vibration at the position of the vibration sensor 8 is unknown. Experimentally determining the threshold of the value ensures determining the abnormality degree without getting the effect of the transfer function (vibration characteristic of machine).

When the magnitude G(f) of the transfer function from the excitation force caused by the bearing failure to the vibration at the position of the vibration sensor 8 is already known within a range of $f_{MIN}$ to $f_{MAX}$, the abnormality degree $U^*(k, f_{ROT}(f, k))$ that can be compared with the unbalance amount regarding the characteristic frequency ratio k can be calculated by the following Math. 11 by measuring the vibration acceleration in the rotational frequency $f_{ROT}$ that satisfies the following Math. 10.

$$\frac{f_{MIN}}{k} \leq f_{ROT} \leq \frac{f_{MAX}}{k} \qquad \text{[Math. 10]}$$

$$U^*(k, f_{ROT}(f, k)) = \frac{A(k, f_{ROT}(f, k))}{(2\pi f_{ROT}(f, k))^2 G(f)} \qquad \text{[Math. 11]}$$

The abnormality degree $U^*(k, f_{ROT}(f, k))$ that can be compared with the unbalance amount is a value that does not depend on the vibration characteristic and the rotation speed (rotational frequency) of the machine similarly to the unbalance amount. However, when the measurement is taken at a rotational frequency at which a transfer function of the characteristic frequency ratio is small, the magnitude of the measured vibration acceleration becomes small. Therefore, it is susceptible to noise and a reliability of the abnormality degree $U^*(k, f_{ROT}(f, k))$ that can be compared with the estimated unbalance amount lowers.

In view of this, it is preferred to improve estimation accuracy for the abnormality degree $U^*(k, f_{ROT}(f, k))$ that can be compared with the unbalance amount calculated based on the acceleration rate measured at the plurality of rotational frequencies by taking a weight average weighted by the magnitude of the transfer function. The weight averaged abnormality degree $U^{}(k)$ weighted by the magnitude of the transfer function of the abnormality degree that can be compared with the unbalance amount can be calculated as the following Math. 12. $U^{}(k)$ is just an average of $U^*(k, f_{ROT}(f, k))$ is obtained, and therefore, it is an evaluation index that can be similarly handled.

$$U^{**}(k) = \frac{\sum_{f_{ROT}} U^*(k, f_{ROT}(f, k)) \times G(f)}{\sum_{f_{ROT}} G(f)} \qquad \text{[Math. 12]}$$

$$= \frac{\sum_{f_{ROT}} \frac{A(k, f_{ROT}(f, k))}{(2\pi f_{ROT}(f, k))^2 G(f)} \times G(f)}{\sum_{f_{ROT}} G(f)}$$

$$= \frac{\sum_{f_{ROT}} \frac{A(k, f_{ROT}(f, k))}{(2\pi f_{ROT}(f, k))^2}}{\sum_{f_{ROT}} G(f)}, \quad \frac{f_{MIN}}{k} \leq f_{ROT} \leq \frac{f_{MAX}}{k}$$

The rotating machines-balance quality requirements of rigid rotors have upper-limit values of balance quality corresponding to balance quality grades in Japanese Industrial Standard B0905. When the mass of the rotator is $M_{ROT}$, the upper-limit value of the balance quality is $G_{MAX}$, a practically applied highest rotation speed is $f_{ROTMAX}$, a permissible residual unbalance $U_{MAX}$ can be obtained as the following Math. 13.

$$U_{MAX} = G_{MAX} \frac{M_{ROT}}{2\pi f_{ROTMAX}} \qquad \text{[Math. 13]}$$

It is determined whether the abnormality degree $U^*(k, f_{ROT}(f, k))$ that can be compared with the unbalance amount or the weighted average abnormality degree $U^{**}(k)$ weighted by the magnitude of the transfer function of the abnormality degree that can be compared with the unbalance amount exceeds the permissible residual unbalance $U_{MAX}$ calculated with Math. 13 or not. Thus, it is determined whether the excitation force caused by the bearing failure is at a level of generating a vibration large enough to fail satisfying the balance quality grades or not to ensure diagnosing the existence of the abnormality.

From the calculated abnormality degree $U^*(k, f_{ROT}(f, k))$ that can be compared with the unbalance amount or the calculated weighted average abnormality degree $U^{**}(k)$ weighted by the magnitude of the transfer function of the abnormality degree that can be compared with the unbalance amount, a representative abnormality degree $U_{rep}$ is calculated. Determining whether the representative abnormality degree $U_{rep}$ exceeds the permissible residual unbalance $U_{MAX}$ calculated with Math. 13 or not also ensures diagnosing the existence of the abnormality. The representative abnormality degree $U_{rep}$ takes the maximum value, for example, as the following Math. 14.

$$U_{rep} = \max_{k}(U^{**}(k)) \qquad \text{[Math. 14]}$$

Conversely, a recommended highest rotation speed $f_{ROTrecommended}$ for being used in a range where only the vibration that satisfies the balance quality grades can be obtained as the following Math. 15.

$$f_{ROTrecommended} = \frac{G_{MAX} M_{ROT}}{2\pi U_{rep}} \qquad \text{[Math. 15]}$$

Figure 3:
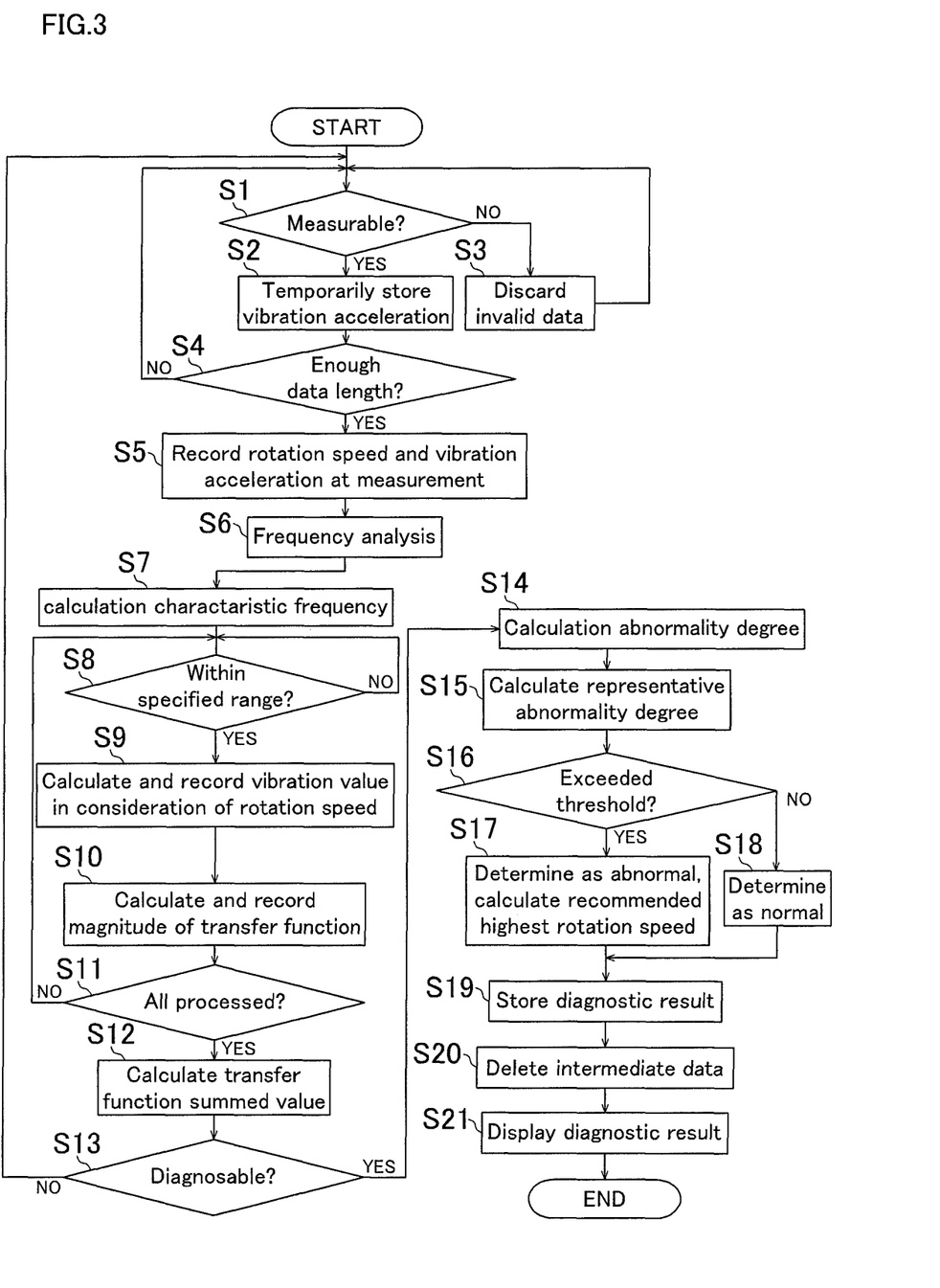
FIG. 3 is a flowchart of an abnormality diagnostic method.

FIG. 3 illustrates a flowchart for a method that executes the abnormality diagnosis for the bearing 7. A specific description will be given based on the flowchart.

S1 to S5 are vibration measurement steps.

First, at S1, it is determined if the spindle 1 is rotating at a constant rotation speed and is not currently machining (that is, in a state where measurement related to abnormality diagnosis is possible). The determination is made from whether the velocity measured with the speed detector 5 is nonzero or not, whether an amount of change of the velocity is equal to or less than a standard value or not, and whether an amount of current supplied to the motor 4 is equal to or less than a standard value or not.

When it is determined that the spindle 1 is rotating at a constant rotation speed and is not currently machining (YES at S1), the vibration acceleration is measured with the vibration sensor 8 and is temporarily stored at S2. On the other hand, when it is NO at S1, a vibration acceleration temporarily stored is discarded at S3, and it is determined again if the spindle 1 is rotating at a constant rotation speed and is not currently machining (S1).

Followed by S2, it is determined if a data length has a point number necessary for diagnosis at S4. When the data length has the point number necessary for diagnosis, (YES at S4), the rotation speed at the measurement and the temporarily stored vibration acceleration are stored at S5. Otherwise (NO at S4), it is determined again if the spindle 1 is rotating at a constant rotation speed and is not currently machining (S1).

S6 is a frequency analyzing step and at S6, the Fourier transformation is performed on the vibration acceleration to calculate a magnitude of the vibration acceleration for each frequency. Then, S7 is characteristic frequency calculation step and at S7, from the rotation speed at the measurement and the bearing specifications, all characteristic frequencies of the bearing 7 as a diagnostic target are calculated using, for example, above-described Maths. 1 and 2.

S8 to S11 are vibration value calculation steps.

At S8, it is determined whether or not P-th characteristic frequency is in a frequency range specified in advance or not. When the P-th characteristic frequency is in the frequency range specified in advance here, a value (vibration value in consideration of rotation speed) obtained by dividing a magnitude of a vibration acceleration at the P-th characteristic frequency of the acceleration rate by the square of the angular velocity at the diagnosis is calculated using, for example, the above-described Math. 6, and is recorded per characteristic frequency ratio at S9. When the P-th characteristic frequency is not in the frequency range specified in advance, the determination at S8 is performed on the next characteristic frequency.

Next, a mounted tool is determined from the current tool number at S10. From the P-th characteristic frequency and the tool, a corresponding transfer function from the excitation force caused by the bearing failure to the vibration at the position of the vibration sensor 8 is selected. A magnitude of the transfer function at the P-th characteristic frequency is obtained and is recorded per characteristic frequency ratio.

Next, at S11, it is determined whether the processing of the characteristic frequency of the bearing 7 as the diagnostic target has been terminated or not, and when it has been terminated, summed values of the magnitudes of the transfer functions recorded at S10 up to here are calculated for the respective characteristic frequency ratios at S12. Otherwise (No at S11), the determination at S8 is performed on the next characteristic frequency.

S12 to S15 are evaluation index calculation steps.

At S13 followed by S12, it is determined whether the summed value of the characteristic frequency ratio with the minimum summed value exceeds a standard value or not (whether abnormality diagnosis is possible or not). Here, when the standard value is exceeded, summed values of the vibration values in consideration of the rotation speeds recorded at S9 up to here are calculated for the respective characteristic frequency ratios (S14). Otherwise, When the standard value is not exceeded, it is determined again if the spindle 1 is rotating at a constant rotation speed and is not currently machining (S1).

After calculation of the summed value of vibration values in consideration of the rotation speeds recorded at S9 up to here, the summed values of the vibration values are divided, at S14, by the summed values of the magnitudes of the transfer functions corresponding to the respective characteristic frequency ratio calculated at S12. Thus, abnormality degrees (for example, weighted average abnormality degrees $U^{**}(k)$ in Math. 12) as weighted average evaluation indexes weighted by the transfer functions are calculated.

Next, at S15, the representative abnormality degree (for example, representative abnormality degree $U_{rep}$ in Math. 14) is calculated from the evaluation index values of all the characteristic frequency ratios.

Next, at S16, it is determined whether the representative abnormality degree exceeds the permissible residual unbalance (for example, permissible residual unbalance $U_{MAX}$ in Math. 13) as the threshold calculated from the mass of the spindle 1, the upper-limit value of the balance quality, and the practically applied highest rotation speed (specified highest rotation speed) or not (determination step).

When the representative abnormality degree exceeds the permissible residual unbalance at the determination at S16, it is determined abnormal at S17. The recommended highest rotation speed (for example, recommended highest rotation speed $f_{ROTrecommended}$ in Math. 15) is calculated as the diagnostic result from the mass of the spindle 1, the upper-limit value of the balance quality, and the representative abnormality degree (recommended highest rotation speed calculation step). When the representative abnormality degree does not exceed the permissible residual unbalance, it is determined normal at S18. Then, the diagnostic result is recorded at S19.

Next, at S20, the summed value of the vibration value in consideration of the rotation speed and the summed value of the magnitude of the transfer function recorded at S9 and S10 are deleted. At S21, the diagnostic result illustrated in FIGS. 4A and 4B is displayed on the display unit 12 (displaying step).

Figure 4A:
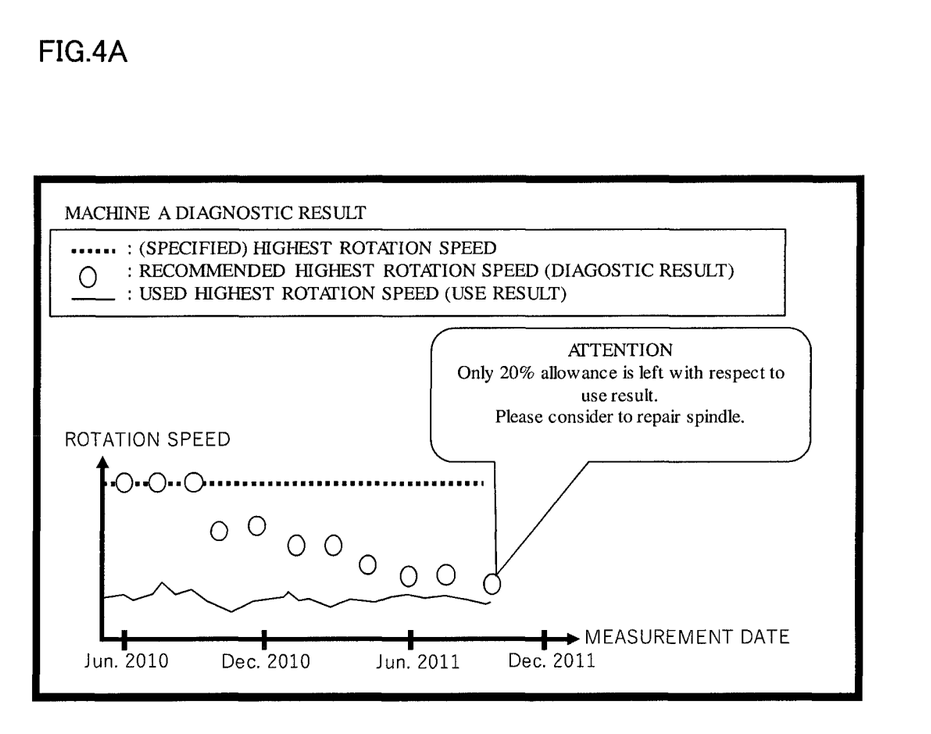
FIGS. 4A and 4B are explanatory diagrams of a diagnostic result display.
Figure 4B:
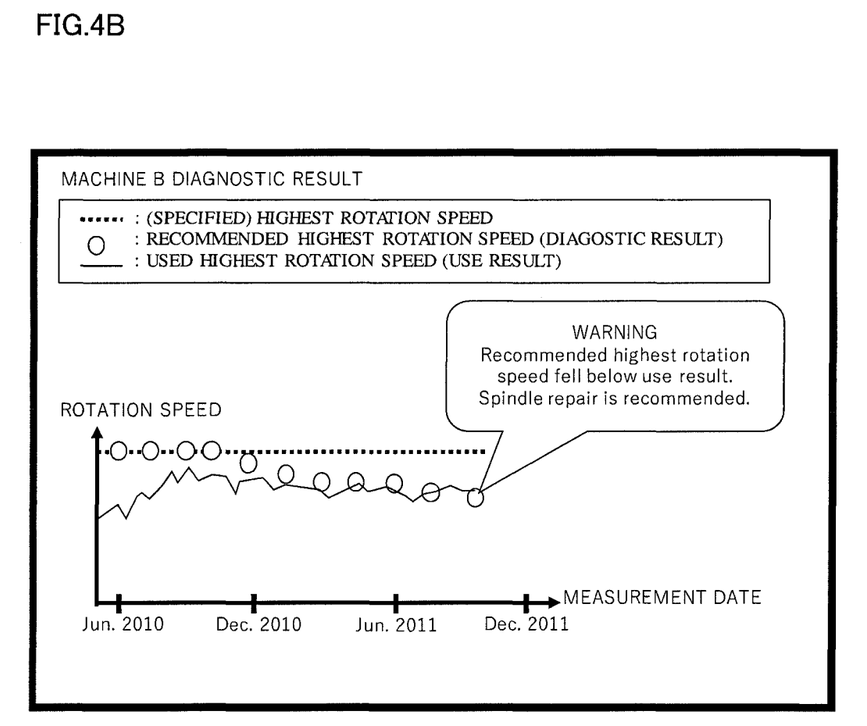

In FIGS. 4A and 4B, the specified highest rotation speed, the used highest rotation speed (use result) for each constant period actually used, and the recommend highest rotation speed calculated by the diagnosis are displayed in chronological order. When the recommended highest rotation speed falls below the use result (machine B in FIG. 4B), it is possible to display a warning.

Thus, with the abnormality diagnostic method and the abnormality diagnostic device for the bearing 7 in the above-described configuration, the effect of the rotation speed can be removed from the measured vibration value. Therefore, appropriately selecting the rotation speed with respect to the characteristic frequency whose value (characteristic frequency ratio) obtained by dividing the characteristic frequency by the rotational frequency is different ensures measuring and comparing as the vibration of any frequency. Thus, it is possible to measure the vibrations of all the characteristic frequency ratios at an identical frequency at which the transfer function is identical. Therefore, for example, a value obtained by dividing the vibration value in consideration of the rotation speed of a certain characteristic frequency ratio by the average value (overall value) of the vibration value in consideration of the rotation speed can be calculated. The value does not get the effect of the transfer function, thereby ensuring evaluation without the effect of the measuring position and the mode of vibration.

Accordingly, the absolute evaluation index that can be compared with that of another machine can be calculated without getting the effect of the rotation speed and the transfer function, thus ensuring a determination the existence of the abnormality with high accuracy.

Meanwhile, when the abnormality is severe and when a plurality of abnormalities simultaneously exist, there is a possibility that the overall value increases. Therefore, there is a possibility that a value obtained by dividing the vibration value in consideration of the rotation speed of the characteristic frequency ratio by the overall value is calculated to be small.

However, it is possible to make the absolute evaluation for the degree of the abnormality since it is calculated the evaluation index (abnormality degree $U^*(k, f_{ROT}(f, k))$) having a dimension identical to that of the unbalance obtained using the vibration value in consideration of the rotation speed and the magnitude of the transfer function here.

Since the weighted average evaluation index (weighted average abnormality degree $U^{}(k)$) weighted by the magnitude of the transfer function is calculated for the evaluation index having the dimension identical to that of the unbalance, the high diagnosis accuracy can be expected although the vibration value, which measured under a condition where the transfer function is small, easily get the effect of noise. Furthermore, since the effect of the rotation speed can be removed from the measured vibration value, even though the range of the characteristic frequency ratio considered in the diagnosis is wide, selecting the rotation speeds corresponding to the respective characteristic frequency ratios ensures a measurement in an identical frequency range. In addition, since only the frequency rage high in estimation accuracy of the transfer function from the excitation force caused by the bearing failure to the vibration at the position of the vibration sensor 8** is used, the high diagnosis accuracy can be expected.

Unlike a diagnostic device that only determines a failure or not, the abnormality degree can be quantitatively calculated as the recommended highest rotation speed. Therefore, when the spindle 1 of the machine tool is the diagnostic target as a rotator, an administrator of the machine tool with abnormality in the bearing 7 can also select to use without a repair as a machine used under the condition only at a low rotation speed equal to or less than the recommended highest rotation speed. It is also possible to make a repair plan by determining which machine should be repaired on a priority basis from the comparison between the respective used highest rotation speeds (use results) and the recommended highest rotation speeds of a plurality of the machine tools.

Furthermore, even when the vibration value in the frequency range in which the transfer function significantly changes by a tool (it may be a jig) mounted on the spindle 1 is used, the high diagnosis accuracy can be expected since the transfer functions corresponding to respective tools and jigs are automatically selected to calculate the evaluation index.

While in the above-described configuration, the representative abnormality degree calculated from the weighted average abnormality degree is used as the evaluation index, the calculated abnormality degree (Math. 11) that can be compared with the unbalance amount or the weighted average abnormality degree (Math. 12) may be used. A completely similar theory exists when both the evaluation index and the threshold in the above-described configuration are multiplied by a constant (for example, 2×pi×practically applied highest rotation speed÷rotator mass). In this case, the upper-limit value of the balance quality itself can be used as the threshold, and it is possible to have a shared threshold for the machine tool spindle.

While in the above-described configuration, in calculating the vibration value in consideration of the rotation speed, it is divided by the square of the angular velocity, another exponent may be used as long as it is a positive number. As a physical quantity in a proportional relation with the angular velocity, the rotation speed and the rotational frequency can obtain a similar effect, thereby being replaceable.

Furthermore, when the representative evaluation index is calculated from the values of the evaluation indexes of all the characteristic frequency ratios, the maximum value of the values of the evaluation indexes of all the characteristic frequency ratios may be used or, for example, a function that uses the values of the evaluation indexes of a plurality of the characteristic frequency ratios may determine the representative evaluation index.

Meanwhile, the measurement of the vibration at the plurality of rotation speeds can be continuously performed in the plurality of rotation speeds determined in advance in a state where the identical tool or the identical jig is attached. In this case, values of the denominators in Math. 12 can be obtained in advance, thereby ensuring the shortened diagnostic period. Even when the tool or the jig whose transfer function is not obtained is mounted, using values of the denominators in Math. 12 of the tool or the jig whose transfer function is already known with a similar inertia moment value ensures approximately calculating the abnormality degree. When there is no transfer function with a close inertia moment value among the tools or the jigs whose transfer functions are already known, the values of the denominators in Math. 12 for the tool or the jig whose transfer functions are not obtained may be determined by interpolation or extrapolation from the values of the denominators in Math. 12 of the tools or the jigs whose plurality of transfer functions are already known with different inertia moments.

Additionally, although the above-described embodiment has been described using the bearing failure caused by the inner race scratch as an example, the embodiment may be applied to different bearing failures, such as a damage in a rolling element.

The disclosure is applicable to a rolling bearing used in a machine other than the machine tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for diagnosing an abnormality of a rolling bearing that supports a rotator, the abnormality diagnostic method comprising the steps of:
    measuring a vibration of the rotator to obtain a measured vibration value (V1);
    performing a frequency analysis on the measured vibration value (V1) to calculate a magnitude of a vibration (V2) at each frequency;

calculating a characteristic frequency as a frequency of a vibration from a specification of the rolling bearing and a rotation speed of the rotator at a vibration measurement in the measuring step;

calculating a vibration value (V3), in which an effect of the rotation speed is removed from (V2), by dividing a magnitude of a vibration at the characteristic frequency by a value including a base and an exponent, the base being a predetermined physical quantity in a proportional relation with an angular velocity of the rotator at the vibration measurement in the measuring step, the exponent being a positive number;

calculating an evaluation index based on a value calculated using the vibration value (V3) and a transfer function from an excitation force caused by a bearing failure to a vibration at a position of the vibration sensor at the characteristic frequency; and determining an existence of an abnormality based on the evaluation index, wherein the measuring step measures the vibration of the rotator using a vibration sensor, wherein in the measuring step, a control device controls a rotation speed of a motor for driving the rotator to a plurality of rotation speeds so that the vibration value (V1) is measured at the plurality of rotation speeds, wherein the step of calculating of the evaluation index calculates the evaluation index, which is obtained by a division of the vibration value (V3) by the transfer function from an excitation force caused by a bearing failure to a vibration at a position of the vibration sensor at the characteristic frequency, and wherein the determining step determines the existence of the abnormality by comparing the evaluation index with a threshold set in advance.

2. The abnormality diagnostic method for a rolling bearing according to claim 1, wherein the exponent is 2.

3. The abnormality diagnostic method for a rolling bearing according to claim 1, wherein the measuring takes vibration measurements at a plurality of the rotation speeds, and
wherein the calculating the evaluation index calculates a weighted average evaluation index as the evaluation index, the weighted average evaluation index being weighted by a magnitude of the transfer function.

4. The abnormality diagnostic method for a rolling bearing according to claim 3, wherein the vibration value and the transfer function for calculating the weighted average evaluation index are used only when the characteristic frequency is included in a range specified in advance.

5. The abnormality diagnostic method for a rolling bearing according to claim 3, further comprising:
when the abnormality is determined in the determining, calculating a recommended highest rotation speed using at least one of the evaluation index, the weighted average evaluation index, a mass of the rotator, and an upper-limit value of a balance quality of a rigid rotor of the rotator.

6. The abnormality diagnostic method for a rolling bearing according to claim 5, further comprising displaying the recommended highest rotation speed on a display unit.

7. The abnormality diagnostic method for a rolling bearing according to claim 1, wherein the rotator is a spindle of a machine tool, and
wherein the calculating the vibration value determines a tool or a jig mounted on the spindle and selects the transfer function corresponding to the determined tool or jig, the transfer function being used for calculating the evaluation index or the weighted average evaluation index.

8. A device that diagnoses an abnormality of a rolling bearing supporting a rotator, the abnormality diagnostic device comprising:
a vibration measurement unit that measures a vibration value (V1) of the rotator using a sensor;
a control device that controls a rotation speed of a motor for driving the rotator to a plurality of rotation speeds so that the vibration value (V1) is measured at the plurality of rotation speeds,
a frequency analysis unit that performs a frequency analysis on the measured vibration value (V1) to calculate a magnitude of a vibration (V2) at each frequency;
a characteristic frequency calculation unit that calculates a characteristic frequency as a frequency of a vibration from a specification of the rolling bearing and a rotation speed of the rotator at a vibration measurement by the vibration measurement unit;
a vibration value calculation unit that calculates a vibration value (V3), in which an effect of the rotation speed is removed from (V2), by dividing a magnitude of a vibration at the characteristic frequency by a value including a base and an exponent, the base being a predetermined physical quantity in a proportional relation with an angular velocity of the rotator at the vibration measurement by the vibration measurement unit, the exponent being a positive number;
an evaluation index calculation unit that calculates an evaluation index based calculated by dividing the vibration value (V3) by a transfer function from an excitation force caused by a bearing failure to a vibration at a position of the vibration sensor at the characteristic frequency; and
a determination unit that determines an existence of an abnormality of the rolling bearing that supports the rotator based on the evaluation index.

* * * * *